United States Patent
Chakkappen et al.

(10) Patent No.: US 11,561,973 B2
(45) Date of Patent: Jan. 24, 2023

(54) STATISTICS BASED QUERY TRANSFORMATION

(71) Applicant: Oracle International Corporation, Redwood Shores, CA (US)

(72) Inventors: Sunil P. Chakkappen, Foster City, CA (US); Mohamed Zait, San Jose, CA (US); Christoforus Widodo, Sunnyvale, CA (US); Hong Su, San Carlos, CA (US)

(73) Assignee: Oracle International Corporation, Redwood Shores, CA (US)

( * ) Notice: Subject to any disclaimer, the term of this patent is extended or adjusted under 35 U.S.C. 154(b) by 334 days.

(21) Appl. No.: 16/147,521

(22) Filed: Sep. 28, 2018

(65) Prior Publication Data

US 2019/0102428 A1   Apr. 4, 2019

Related U.S. Application Data

(60) Provisional application No. 62/566,299, filed on Sep. 29, 2017.

(51) Int. Cl.
*G06F 16/00* (2019.01)
*G06F 16/2453* (2019.01)
(Continued)

(52) U.S. Cl.
CPC .......... *G06F 16/24542* (2019.01); *G06F 7/14* (2013.01); *G06F 16/2282* (2019.01);
(Continued)

(58) Field of Classification Search
CPC ............. G06F 16/2282; G06F 16/2365; G06F 16/2386; G06F 16/24532; G06F 16/24542; G06F 16/2462; G06F 16/951; G06F 7/14
See application file for complete search history.

(56) References Cited

U.S. PATENT DOCUMENTS 5,850,547 A      12/1998   Waddington et al.
6,529,896 B1 *   3/2003    Leung ............... G06F 16/24535
(Continued)

OTHER PUBLICATIONS

Oracle, "Create Materialized Zonemap", Oracle Database Online Documentation 12c Release dated Aug. 4, 2017, 7 pages.

(Continued)

*Primary Examiner* — Shew Fen Lin
(74) *Attorney, Agent, or Firm* — Hickman Becker Bingham Ledesma LLP

(57) ABSTRACT

Techniques are described for responding to aggregate queries using optimizer statistics already available in the data dictionary of the database in which the database object targeting by the aggregate query resides, without the user creating any additional objects (e.g. materialized views) and without requiring the objects to be loaded into volatile memory in a columnar fashion. The user query is rewritten to produce a transformed query that targets the dictionary tables to form the aggregate result without scanning the user tables. "Accuracy indicators" may be maintained to indicate whether those statistics are accurate. Only accurate statistics are used to answer queries that require accurate answers. The accuracy check can be made during runtime, allowing the query plan of the transformed query to be used regardless of the accuracy of the statistics. For queries that request approximations, inaccurate statistics may be used so long as the statistics are "accurate enough".

22 Claims, 2 Drawing Sheets

(51) Int. Cl.
*G06F 7/14* (2006.01)
*G06F 16/22* (2019.01)
*G06F 16/23* (2019.01)
*G06F 16/951* (2019.01)
*G06F 16/2458* (2019.01)

(52) U.S. Cl.
CPC ...... *G06F 16/2365* (2019.01); *G06F 16/2386* (2019.01); *G06F 16/2462* (2019.01); *G06F 16/24532* (2019.01); *G06F 16/951* (2019.01)

(56) References Cited

U.S. PATENT DOCUMENTS

| | | | |
|---|---|---|---|
| 6,882,993 | B1 | 4/2005 | Lawande et al. |
| 9,477,702 | B1 | 10/2016 | Ramachandran |
| 9,569,490 | B1 | 2/2017 | Kalarikal |
| 2001/0013030 | A1* | 8/2001 | Colby ................ G06F 16/22 |
| 2002/0029207 | A1 | 3/2002 | Bakalash |
| 2004/0064466 | A1* | 4/2004 | Manikutty ........ G06F 16/8373 |
| 2004/0122814 | A1* | 6/2004 | Zhang ............. G06F 16/24556 |
| 2005/0010564 | A1 | 1/2005 | Metzger |
| 2007/0050391 | A1* | 3/2007 | Chatterjee ........... G06F 16/284 |
| 2007/0192296 | A1* | 8/2007 | Burger ............ G06F 16/24549 |
| 2007/0233637 | A1 | 10/2007 | Corvinelli |
| 2008/0098045 | A1* | 4/2008 | Radhakrishnan ..... G06F 16/284 |
| 2009/0018992 | A1* | 1/2009 | Zuzarte ............. G06F 16/2453 |
| 2009/0019005 | A1* | 1/2009 | Hu .................. G06F 16/24539 |
| 2009/0019103 | A1 | 1/2009 | Tommaney |
| 2009/0319477 | A1* | 12/2009 | Idicula ............ G06F 16/24534 |
| 2010/0169302 | A1* | 7/2010 | Lopes ............. G06F 16/24556 707/713 |
| 2010/0198808 | A1* | 8/2010 | Graefe ............ G06F 16/24549 707/713 |
| 2011/0035369 | A1 | 2/2011 | Halasipuram |
| 2012/0084287 | A1 | 4/2012 | Lakshminarayan |
| 2013/0151491 | A1 | 6/2013 | Gislason |
| 2014/0095472 | A1* | 4/2014 | Lee .................. G06F 16/24542 707/714 |
| 2015/0006509 | A1* | 1/2015 | Shao ................ G06F 16/2462 707/719 |
| 2015/0088812 | A1 | 3/2015 | Ziauddin |
| 2015/0286681 | A1 | 10/2015 | Baer |
| 2015/0363447 | A1 | 12/2015 | Dickie |
| 2016/0140137 | A1 | 5/2016 | Konik |
| 2016/0162548 | A1 | 6/2016 | Dickie |
| 2016/0162599 | A1 | 6/2016 | Dickie |
| 2016/0253379 | A1 | 9/2016 | Ford |
| 2017/0116136 | A1 | 4/2017 | Macnicol |
| 2017/0116267 | A1 | 4/2017 | Boehme |
| 2017/0177667 | A1 | 6/2017 | Boehme |
| 2018/0246950 | A1 | 8/2018 | Arye |
| 2018/0260439 | A1 | 9/2018 | Beier |
| 2018/0300350 | A1 | 10/2018 | Mainali |
| 2019/0163771 | A1 | 5/2019 | Kirk |
| 2019/0236192 | A1 | 8/2019 | Zou |
| 2019/0362006 | A1 | 11/2019 | Ziauddin |

OTHER PUBLICATIONS

Macnicol, U.S. Appl. No. 15/268,524, filed Sep. 16, 2016, Notice of Allowance, dated Sep. 6, 2018.
Macnicol, U.S. Appl. No. 15/268,254, filed Sep. 16, 2016, Notice of Allowance, dated Mar. 27, 2018.
Ziauddin, U.S. Appl. No. 15/987,619, filed May 23, 2018, Office Action, dated Jun. 12, 2020.
Ziauddin, U.S. Appl. No. 15/987,619, filed May 23, 2018, Office Action, dated Dec. 15, 2020.
Ziauddin, U.S. Appl. No. 15/987,619, filed May 23, 2018, Notice of Allowance and Fees Due, dated Jan. 4, 2022.
Ziauddin, U.S. Appl. No. 15/987,619, filed May 23, 2018, Advisory Action, dated Oct. 20, 2021.
Ziauddin, U.S. Appl. No. 15/987,619, filed May 23, 2018, Final Office Action, dated Jun. 29, 2021.

* cited by examiner

STATISTICS BASED QUERY TRANSFORMATION

CROSS-REFERENCE TO RELATED APPLICATIONS; BENEFIT CLAIM

This application claims the benefit of Provisional Appln. 62/566,299, filed Sep. 29, 2017, the entire contents of which is hereby incorporated by reference as if fully set forth herein, under 35 U.S.C. § 119(e).

FIELD OF THE INVENTION

The present invention relates to aggregate queries and, more specifically, to techniques for deriving aggregate values based on statistics maintained in data dictionaries.

BACKGROUND

It is common for a database server to receive simple queries with aggregate functions like count, min, max etc. on the table. For these simple queries, database servers typically scan the table to aggregate the column data.

It is possible to use a materialized view to return the results of these kind of queries with aggregation functions. A materialized view is a database object (e.g. another table) that contains the results of a query. For example, it may be a local copy of data located remotely, or may be a subset of the rows and/or columns of a table or join result, or may be a summary using an aggregate function.

When a user query can be answered by data maintained in a materialized view, the user query is rewritten by the database server to obtain the data from the materialized view, which has fewer rows than the original base table, and can be scanned faster than the original base table.

The use of materialized views to answer queries that contain aggregate functions requires the user to create the materialized view object. This additional object has to be refreshed/maintained whenever Data Manipulation Language (DML) operations (e.g. delete, insert and update) are performed on the base table. The maintenance of the materialized views requires additional objects like materialized view logs (a journal of rows modified, etc.). The maintenance causes more overhead on DMLs and uses space on disk for storing the materialized view and its logs. Materialized views and techniques for maintaining them are described in detail in U.S. Pat. No. 6,125,360, the contents of which is incorporated herein by reference.

Another technique used for increasing the performance of aggregate queries involves storing a copy of data in volatile memory in columnar fashion. Along with that columnar data, aggregate information can be stored for each columnar unit. When a query requires aggregation across a table, the result may be aggregated from the aggregated information available in each columnar unit, as is described, for example, in U.S. patent application Ser. No. 15/987,619, filed May 23, 2018, the contents of which are incorporated herein by reference.

Unfortunately, in-memory columnar units are limited to the memory available, so some of the database objects that are targeted by aggregate queries may not be available in the in-memory columnar storage. Further, even if the object targeted by an aggregate query is stored in an in-memory columnar unit along with corresponding aggregate information, there is a cost of going through all the columnar units for a particular column to derive an aggregate value for that column.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1:
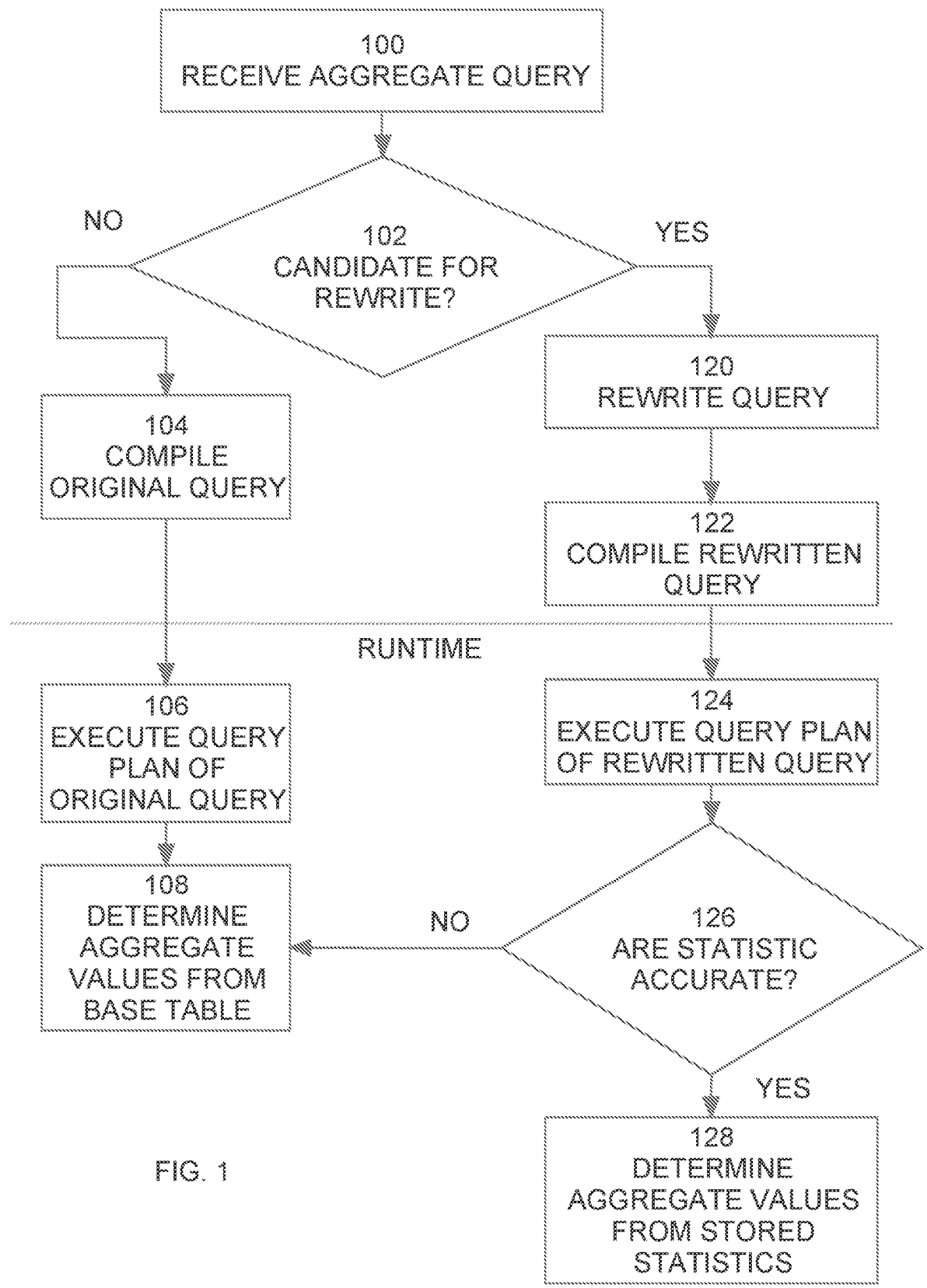
FIG. 1 is a flowchart illustrating steps for processing an aggregate query based on statistics maintained in the data dictionary of a database, according to an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are provided for responding to aggregate queries using optimizer statistics already available in data dictionary tables, without the user creating any additional objects (e.g. materialized views) and without requiring the objects to be loaded into volatile memory in a columnar fashion. Specifically, according to one embodiment, the user query is rewritten to target the dictionary tables to form the aggregate result without scanning the user tables.

For example "select count(*) from lineitem" (Query 1) can be transformed as:

```
QUERY 2:
select count(*) from lineitem
where (select status from tab$
    where obj# = <object # of lineitem>) != 'CORRECT'
union all
select rows from tab$
    where status = 'CORRECT'
    and obj# = <object # of lineitem>
```

In the database accessed by Query 2, the STATUS column and the obj# column are in the same table tab$. In Query 2, the first union all branch is used if the statistics (for the object having the specified object number) that available in dictionary are not correct at the point of executing the query. The second union all branch in Query 2 is used when the statistics for that object are correct. The status of statistics is maintained (or cleared) when DML operations are performed and if statistics are not maintained online. Additional details about this transformed query shall be described in detail hereafter.

This technique can be used for any aggregate functions that can be answered using accurate statistics available in dictionary. For example, some database systems maintain exact min/max statistics in their data dictionary tables. In such systems, min, max aggregations can be answered using these statistics. In addition, some database systems maintain approximate statistics about the number of distinct values in a given column. In such systems, count(distinct . . . ) queries can be answered using the statistics if user is looking for approximate answers.

The same technique can be used for partitions of a table as well. The result can be returned from statistics of partitions whose statistics are currently accurate. The result of rest of the partitions can be computed by scanning those partitions. The results can be merged to form the final result.

The techniques used herein may be used to process queries that require aggregation functions including, but not limited to, MAX, MIN, SUM, COUNT, AVG., STDEV, and PERCENTILE. For those aggregate operations, such as AVG., the statistics may include two values (e.g. SUM and COUNT) from which the aggregate can be derived.

Using Statistics for Query Optimization

Frequently, the results for a single query can be derived in many alternative ways. For example, when answering a particular query, the database server may have the option of using various auxiliary structures, such as indexes and materialized views, to answer the query faster. The portion of a database system that is responsible for selecting the best way of processing a query is referred to as the "query optimizer".

Conventionally, the query optimizer uses statistics, maintained in one or more tables of the data dictionary of a database, to select the best way to process a query. For the purpose of selecting the optimal query plan for a query, the statistics need not be accurate. As long as the statistics are approximately correct (e.g. the statistics indicate that a column as 10 distinct values, when it actually has 11), the optimizer will typically be able to select the best query plan based on the statistics.

Using Statistics for Answering Aggregate Queries

The techniques described herein involve using the statistics as a pre-computed source of aggregated data to answer the query. For the purpose of answering a query, providing an "approximately correct" answer is typically not acceptable (unless the query itself requests an approximation). Consequently, according to one embodiment, a mechanism is provided for tracking which statistics within the data dictionary are accurate, and which are not. According to one embodiment, an indicator that indicates whether a table's statistics are accurate is maintained in a table within the data dictionary of the database that contains the table.

FIG. 1 is a flowchart that illustrates the steps for answering an aggregate query with statistics maintained in the data dictionary, according to an embodiment. Referring to FIG. 1, at step 100 an aggregate query is received at the database server. At step 102, the database server determines whether the aggregate query is a candidate for rewrite. In general, an aggregate query is a candidate for rewrite if at least a portion of the aggregation required by the query can be derived from statistics maintained in the data dictionary.

For example, assume that the aggregate query received at step 100 requires the minimum value in a column cl of table T. If the data dictionary stores the minimum value of column cl of table T, then the aggregation required by the query can be derived from the statistics, and control would pass from step 102 to step 120. As another example, assume that the query requires the average salary for a "salary" column of table T. Average can be derived based on a (a) count of rows that contain non-null salary values, and (b) a sum of the values in the "salary" column. If both the statistics for table T include the count of rows that contain non-null salary values and the sum of salary values, then the query is a candidate for rewrite, and control passes to step 120.

Significantly, in one embodiment, the decision made at step 102 does not hinge on whether the statistics maintained by the database are actually accurate. Even when the statistics are not accurate at the time of query compilation, they may be updated to be accurate at a later time so that they may be used to satisfy queries. As shall be describe in greater detail below, the question of whether the statistics are accurate is addressed during runtime execution of the query.

It is possible for a query to not be a candidate for rewrite even though the data dictionary normally would store the needed statistics. For example, the data dictionary may have a size limit on the values stored in the data dictionary. If the database normally maintains "maximum value" statistics for a column, but the maximum value in the column exceeds the size limit of the data dictionary, then that query is not a candidate for rewrite.

If the query is not a candidate for rewrite, then control passes from step 102 to step 104 where the query is handled in the conventional manner. Specifically, at step 104 the query is compiled (if an execution plan for the query does not already exist), and at step 106 the query plan for that original query is executed. The original query was not rewritten to access the statistics, so execution of the query involves determining the aggregate values required by the query from a source other than the statistics, which typically will be the data stored in the database object targeted by the original query. For example, if the query requests the average salary of employees in the emp table, and the database does not maintain statistics needed to derive the average salary, then the average salary would be computed by summing all of the non-null salaries in the emp table and dividing that sum by the count of non-null salary values.

On the other hand, if it is determined at step 102 that the aggregate query is a candidate for rewrite, then the query is rewritten to derive the needed aggregate values from the statistics in the data dictionary. As shall be describe in detail hereafter, the query can be rewritten in a way that makes use of the stored statistics when those statistics are accurate, and derives the aggregates from the data in the base table when the statistics are not accurate.

At step 122, the rewritten query is compiled to generate a query execution plan (if one does not already exist for the rewritten query). At step 124, that execution plan is executed. As mentioned above, during execution of the query plan, the database server determines (at step 126) whether the statistics needed to derive the aggregate value(s) required by the query are accurate. If the statistics are not accurate, then control passes to step 108 and the query is answered by aggregating data from the base table. However, if the statistics are accurate, control passes to step 128 and the aggregate values required by the query are determined from the stored statistics. As shall be described in greater detail below, in situations where the statistics are maintained at the level of partitions, the database server may derive aggregate values based on (a) statistics from the partitions whose statistics are accurate, and (b) scans of the partitions whose statistics are not accurate.

Query Rewrite Example

As mentioned above, when it is determined that an aggregate query is a candidate for rewrite, the query is rewritten in a manner to target the stored statistics (step 120 of FIG. 1). For the purpose of explaining how a query can be rewritten in this manner, it shall be assumed that the database server has received Query 1 "select count(*) from lineitem" requests the count of rows from the table "lineitem". For the purpose of explanation, it shall also be assumed that:

the database dictionary includes a "tab$" table;
the table "tab$" has one row per database object;
within tab$, the row for a given object includes the columns "obj#", "status" and "rows";
the obj# column indicates the object number of the object to which the row corresponds;
the status column of a row indicates whether the table-level statistics are currently accurate for the object to which the row corresponds;
the "rows" column of a tab$ row indicates how many rows are in the object that corresponds to the tab$ row.

Under these circumstances, the following clause (Clause 1) is only true when, within the tab$ table, the status column associated with the lineitem table is false (thereby indicating that the table-level statistics for lineitem are not currently accurate):

```
CLAUSE 1:
    where (select status from tab$
        where obj# = <object # of lineitem>) != 'CORRECT'
```

Conversely, the following clause (Clause 2) is only true when, within the tab$ table, the status column associated with the lineitem table is true (thereby indicating that the table-level statistics for lineitem are currently accurate):

```
CLAUSE 2:
    where (select status from tab$
        where obj# = <object # of lineitem>) = 'CORRECT'
```

These two clauses are included in the transformed query (Query 2):

```
select count(*) from lineitem
where (select status from tab$
    where obj# = <object # of lineitem>) != 'CORRECT'
union all
select rows from tab$
where (select status from tab$
    where obj# = <object # of lineitem>) = 'CORRECT'
and obj# = <object # of lineitem>
```

Because of these clauses, the initial query "select count(*) from lineitem" is executed against the table lineitem when the table-level statistics for lineitem are not accurate, and executed against the statistics in the database dictionary when the table-level statistics are accurate. Specifically, when the table-level statistics are accurate, the following query:

```
select rows from tab$
    where obj# = <object # of lineitem>
``` is executed against the data dictionary table tab$ to retrieve the pre-computed count of rows from the "rows" column of the row, within tab$, that corresponds to the lineitem table.

Single Query Plan for Two Scenarios

As explained above, a single query plan (the plan generated for the transformed query) is used both in the scenario where the statistics are accurate, and in the scenario where the statistics are not accurate. Consequently, at compile time, the optimizer need not inspect the underlying accuracy indicators in the data dictionary to determine how to compile an aggregate query. As long as the aggregate query is a candidate for rewrite, the query plan for the rewritten query can be used. As explained above, that rewritten query plan checks the accuracy of the statistics during query runtime, and branches based on whether the required statistics are accurate.

Transaction-Specific Statistics

For consistency, it is common for database servers to assign a "snapshot time" to a transaction, and to only allow that transaction to see changes that were committed by other transactions as of that snapshot time. If a transaction X needs to see a data item that was changed by another transaction Y that committed prior to the snapshot time of transaction X, the database server provides transaction Y a reconstructed copy of the data item as of the snapshot time of transaction X (which will not reflect the post-snapshot change made by transaction Y). Transaction semantics also require each transaction to see the changes it itself has already made.

According to one embodiment, the accuracy indicators for the statistics are not updated until the commit time of the transaction that made the change that causes the statistics to become inaccurate. For example, assume that the database server maintains a statistic that indicates the maximum salary value currently in the emp table. Assume that the maximum salary statistic is currently 1,000,000, and that the statistic is accurate. Under these circumstances, assume that a transaction T1 inserts a row into the emp table with a salary of 1,500,000. Since this new salary is higher than the previous maximum, the maximum of 1,000,000 is not accurate for any transaction that can see the new row. However, until T1 commits, only T1 can see the new row. Therefore, the 1,000,000 value is still accurate for all transactions that have a snapshot time before the commit time of T1.

Transaction T1 can change the accuracy indication to "false". This indication change will not prevent other transactions with snapshots before the commit time of T1 from using the 1,000,000 value, because those transactions will not see the indication change for the same reason that they will not see the new row, since both changes will be committed after their respective snapshot times.

Rather than change the accuracy indication to "false", transaction T1 may change the maximum salary statistic to 1,500,000. Even prior to committing, transaction T1 itself will see this change, and will be able to use the salary statistic 1,500,000 to answer any statement within T1 that requires the maximum salary in the emp table. Thus, due to transactional semantics, it is possible for a transaction to have its own transaction-specific statistic (e.g. the 1,500,000 maximum salary value) that only becomes visible to other transactions when that transaction commits.

Partition-Level Statistics

In the examples discussed above, the statistics are maintained in the data dictionary at the table level. However, instead of or in addition to maintaining statistics at the table level, statistics for a partitioned table may be maintained at a partition level. Partition-level statistics may be useful when, for example, a query specifies a condition that aligns with partition boundaries. For example, assume that an "emp" table has a "gender" column, and has been partitioned into two partitions based on the gender column. Under these circumstances, "select count(*) from emp where gender='male'" may be satisfied using a partition-level "row count" statistic for the partition that corresponds to "male".

As another example, the lineitem table may be partition based on salesdate, where each partition corresponds to a different quarter of the year. Under these circumstances, a query that requests a statistic (such as count(*)) for a specific quarter may be satisfied by using the partition-level statistic of the appropriate partition. For queries that cover a specific set of quarters, the partition-level statistics for that set of quarters may be combined to answer the query.

In the situations where partition-level statistics are maintained instead of table-level statistics, the partition-level statistics may be aggregated to answer queries that request one or more table-level statistics. For example, if no table-level statistics are maintained for the lineitem table, the query "select count(*) from lineitem" may still be answered by summing the partition-level row count statistics of each of the partitions of the lineitem table. The same is true if table-level statistics are maintained along with the partition-level statistics, but the table-level statistics are currently inaccurate.

The accuracy of partition-level statistics may vary from partition to partition. Consequently, whether aggregate values are obtained from the statistics or from the base table may also vary from partition to partition. For example, assume that the table lineitem is partitioned based on quarter, and that it currently stores data for 10 quarters. It is possible that the partition-level statistics for the lineitem table are accurate for 8 of the 10 quarters. Under these circumstances, the query "select count(*) from lineitem" may be handled by scanning the two partitions that do not have accurate statistics, and combining that rowcount with the rowcount statistics of the partitions that correspond to the other 8 quarters.

Approximate Queries and Histograms

Under normal conditions, statistics have to be accurate in order to be used to answer a query (as opposed to being used to determine how to optimize a query). However, there are circumstances in which the query itself, or a session parameter of the session in which the query is issued, indicates that an approximate answer is good enough. In addition, certain statistics, such as histograms derived from samples, are necessarily approximations.

When an aggregate query can be answered with an approximation, whether because the query specified "approximate", the session parameter was set to approximate, or the aggregation requested is necessarily approximate (e.g. histograms), it may be possible to answer the query from the stored statistics even though the stored statistics are not accurate.

In one embodiment, under these circumstances, the statistics are presumed accurate enough, and the approximate aggregate queries are answered based on the statistics. In an alternative embodiment, a separate accurate-enough indicator is maintained to indicate whether the statistics are accurate enough to be used with approximate queries. The accurate-enough indicator may be set to "false", for example, if the number of updates (including deletes and inserts) that have occurred since the last refresh of the statistics exceeds a certain threshold. Thus, if ten rows have been added to a table, the statistics may not be accurate, but they may be accurate enough for use with an approximate query. On the other hand, if 1000 rows have been added since the statistics were refreshed, then even the accurate-enough indicator may be set to "false".

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 2:
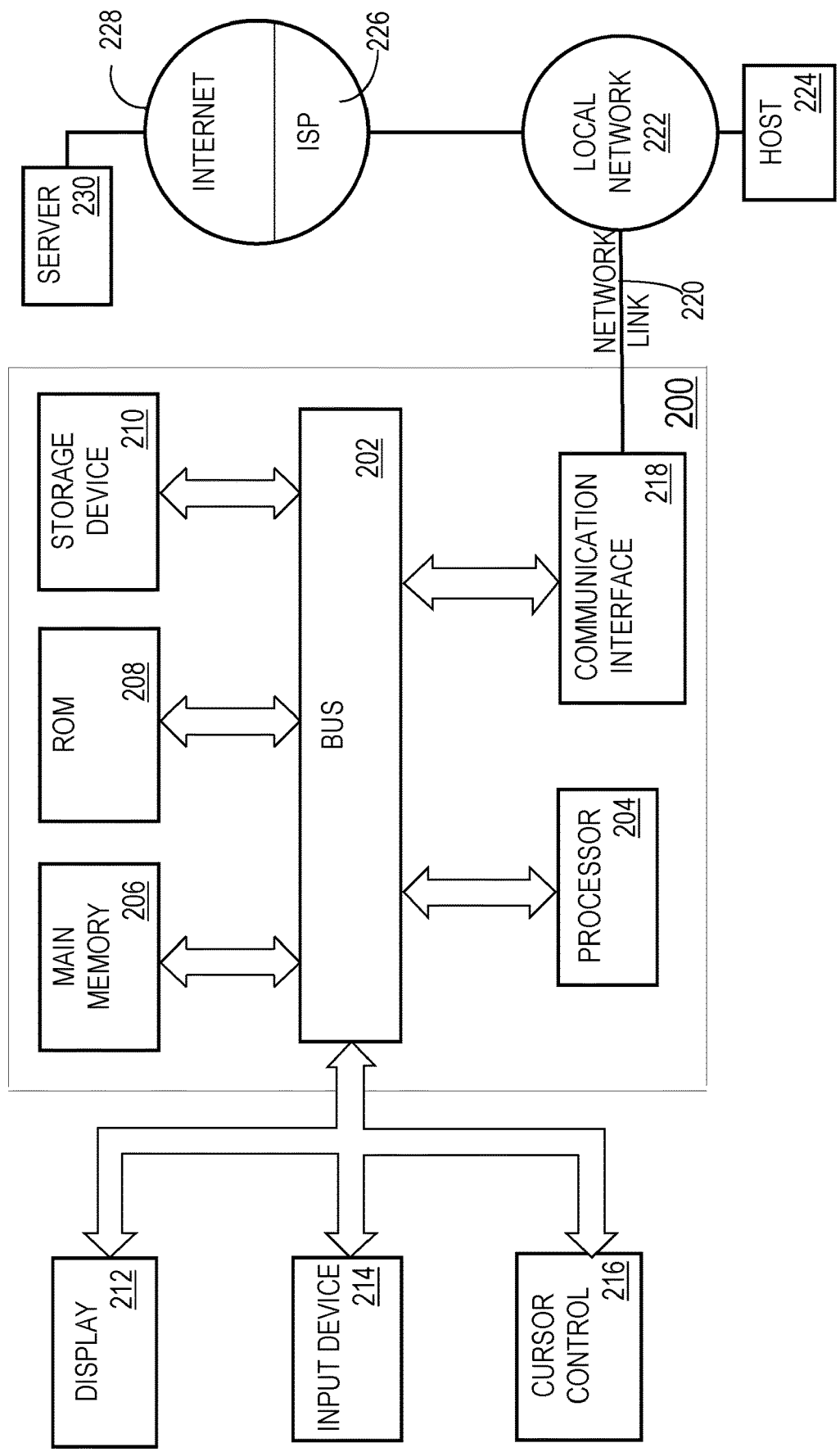
FIG. 2 is a block diagram of a computer system upon which the techniques described herein may be implemented.

For example, FIG. 2 is a block diagram that illustrates a computer system 200 upon which an embodiment of the invention may be implemented. Computer system 200 includes a bus 202 or other communication mechanism for communicating information, and a hardware processor 204 coupled with bus 202 for processing information. Hardware processor 204 may be, for example, a general purpose microprocessor.

Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Such instructions, when stored in non-transitory storage media accessible to processor 204, render computer system 200 into a special-purpose machine that is customized to perform the operations specified in the instructions.

Computer system 200 further includes a read only memory (ROM) 208 or other static storage device coupled to bus 202 for storing static information and instructions for processor 204. A storage device 210, such as a magnetic disk, optical disk, or solid-state drive is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

Computer system 200 may implement the techniques described herein using customized hard-wired logic, one or more ASICs or FPGAs, firmware and/or program logic which in combination with the computer system causes or programs computer system 200 to be a special-purpose machine. According to one embodiment, the techniques herein are performed by computer system 200 in response to processor 204 executing one or more sequences of one or more instructions contained in main memory 206. Such instructions may be read into main memory 206 from another storage medium, such as storage device 210. Execution of the sequences of instructions contained in main memory 206 causes processor 204 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 210. Volatile media includes dynamic memory, such as main memory 206. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 202. Transmission media can also take the form of acoustic or light waves, such as those generated during radio-wave and infra-red data communications.

Various forms of media may be involved in carrying one or more sequences of one or more instructions to processor 204 for execution. For example, the instructions may initially be carried on a magnetic disk or solid-state drive of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card, cable modem, satellite modem, or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are example forms of transmission media.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
storing, in a data dictionary, definition information for database objects that belong to a database;
wherein the data dictionary is implemented as one or more database dictionary tables;
wherein the database is managed by a database server;
receiving a query at the database server;
in response to receiving the query at the database server, the database server:
 determining that the query contains an aggregate function that targets a database object that:
  is defined in the database dictionary; and
  resides in the database managed by the database server;
 wherein the aggregate function produces one or more aggregate values when applied to a set of values in the database object;
 determining that at least a portion of the one or more aggregate values can be derived from statistics, maintained for the database object, in the one or more database dictionary tables that implement the data dictionary of the database;
 rewriting the query to produce a rewritten query that causes the one or more aggregate values to be derived from the statistics, maintained for the database object, stored in the one or more database dictionary tables that implement the data dictionary of the database;
 executing an execution plan that corresponds to the rewritten query; and
 during execution of the execution plan, deriving the at least a portion of the one or more aggregate values from the statistics, maintained for the database object, obtained from the one or more database dictionary tables that implement the data dictionary of the database;
wherein the method is performed by one or more computing devices.

2. The method of claim 1 wherein:
executing the execution plan includes determining whether the statistics required to derive the at least a portion of the one or more aggregate values are currently accurate; and
deriving the at least a portion of the one or more aggregate values from the statistics is performed responsive to determining that the statistics required to derive the at least a portion of the one or more aggregate values are currently accurate.

3. The method of claim 2 wherein:
the database object is a partitioned object;
the method comprises:
 storing partition-level statistics for a plurality of partitions of the partitioned object; and
 storing partition-level indicators that indicate whether statistics for each partition of the plurality of partitions are currently accurate;
deriving the at least a portion of the one or more aggregate values includes aggregating partition-level statistics of two or more partitions of the plurality of partitions.

4. The method of claim 2 wherein:
the database object is a partitioned object;
the method comprises:
 storing partition-level statistics for a plurality of partitions of the partitioned object; and
 storing partition-level indicators that indicate whether statistics for each partition of the plurality of partitions are currently accurate;
the plurality of partitions includes:
 at least one first partition of the plurality of partitions whose partition-level indicator indicates that the statistics of the at least one first partition are accurate; and
 at least one second partition of the plurality of partitions whose partition-level indicator indicates that the statistics of the at least one second partition are not accurate;
deriving a first portion of the one or more aggregate values includes, for the at least one first partition, using partition-level statistics; and
deriving a second portion of the one or more aggregate values includes, for the at least one second partition, aggregating data from the at least one second partition.

5. The method of claim 1 wherein:
the database object is a partitioned object;
the method comprises:
 storing partition-level statistics for a plurality of partitions of the partitioned object; and
 determining that conditions specified in the query limit application of the aggregate function to a set of one or more partitions of the plurality of partitions;
 wherein the set of one or more partitions is less than all partitions of the partitioned object; and
deriving the at least a portion of the one or more aggregate values includes deriving the one or more aggregate values using partition-level statistics of at least one partition from the set of one or more partitions.

6. The method of claim 1, wherein the query is a first query, further comprising:
receiving a second query at the database server;
in response to receiving the second query at the database server, the database server:
 determining that the second query contains the aggregate function that targets the database object;
 determining that at least a portion of the one or more aggregate values can be derived from statistics maintained for the database object in the data dictionary of the database;
 rewriting the query to produce the rewritten query;
 executing the execution plan that corresponds to the rewritten query; and
 during execution of the execution plan, determining that statistics maintained for the database object in the data dictionary of the database are not accurate;
 responsive to determining that statistics maintained for the database object in the data dictionary of the database are not accurate, generating the one or more aggregate values by aggregating data retrieved from the database object during runtime of the second query.

7. The method of claim 1 further comprising:
determining that approximation is acceptable for the query; and
deriving at least a portion of the one or more aggregate values from statistics that are not accurate.

8. The method of claim 7 wherein determining that approximation is acceptable to the query includes determining that the query has been explicitly designated as an approximate query.

9. The method of claim 7 wherein determining that approximation is acceptable to the query includes determining that the query was issued in a session in which a session parameter indicates that approximate answers are acceptable.

10. The method of claim 7 wherein determining that approximation is acceptable to the query includes determining that the query specifies generation of a histogram.

11. The method of claim 7 wherein deriving the at least a portion of the one or more aggregate values from the statistics that are not accurate is performed responsive to determining that an accurate-enough indicator indicates that the statistics that are not accurate are accurate enough for approximate answers.

12. One or more non-transitory computer-readable media storing instructions which, when executed by one or more computing devices, cause:
storing, in a data dictionary, definition information for database objects that belong to a database;
wherein the data dictionary is implemented as one or more database dictionary tables;
wherein the database is managed by a database server;
receiving a query at the database server;
in response to receiving the query at the database server, the database server:
determining that the query contains an aggregate function that targets a database object that:
is defined in the database dictionary; and
resides in the database managed by the database server;
wherein the aggregate function produces one or more aggregate values when applied to a set of values in the database object;
determining that at least a portion of the one or more aggregate values can be derived from statistics, maintained for the database object, stored in the one or more database dictionary tables that implement the data dictionary of the database;
rewriting the query to produce a rewritten query that causes the one or more aggregate values to be derived from the statistics, maintained for the database object, stored in the one or more database dictionary tables that implement the data dictionary of the database;
executing an execution plan that corresponds to the rewritten query; and
during execution of the execution plan, deriving the at least a portion of the one or more aggregate values from the statistics, maintained for the database object, obtained from the one or more database dictionary tables that implement the data dictionary of the database.

13. The one or more non-transitory computer-readable media of claim 12 wherein:
executing the execution plan includes determining whether the statistics required to derive the at least a portion of the one or more aggregate values are currently accurate; and
deriving the at least a portion of the one or more aggregate values from the statistics is performed responsive to determining that the statistics required to derive the at least a portion of the one or more aggregate values are currently accurate.

14. The one or more non-transitory computer-readable media of claim 13 wherein:
the database object is a partitioned object;
the instructions further cause:
storing partition-level statistics for a plurality of partitions of the partitioned object; and
storing partition-level indicators that indicate whether statistics for each partition of the plurality of partitions are currently accurate;
deriving the at least a portion of the one or more aggregate values includes aggregating partition-level statistics of two or more partitions of the plurality of partitions.

15. The one or more non-transitory computer-readable media of claim 13 wherein:
the database object is a partitioned object;
the instructions further cause:
storing partition-level statistics for a plurality of partitions of the partitioned object; and
storing partition-level indicators that indicate whether statistics for each partition of the plurality of partitions are currently accurate;
the plurality of partitions includes:
at least one first partition of the plurality of partitions whose partition-level indicator indicates that the statistics of the at least one first partition are accurate; and
at least one second partition of the plurality of partitions whose partition-level indicator indicates that the statistics of the at least one second partition are not accurate;
deriving a first portion of the one or more aggregate values includes, for the at least one first partition, using partition-level statistics; and
deriving a second portion of the one or more aggregate values includes, for the at least one second partition, aggregating data from the at least one second partition.

16. The one or more non-transitory computer-readable media of claim 12 wherein:
the database object is a partitioned object;
the instructions further cause:
storing partition-level statistics for a plurality of partitions of the partitioned object; and
determining that conditions specified in the query limit application of the aggregate function to a set of one or more partitions of the plurality of partitions;
wherein the set of one or more partitions is less than all partitions of the partitioned object; and
deriving the at least a portion of the one or more aggregate values includes deriving the one or more aggregate values using partition-level statistics of at least one partition from the set of one or more partitions.

17. The one or more non-transitory computer-readable media of claim 12, wherein the query is a first query, and the instructions further cause:
receiving a second query at the database server;
in response to receiving the second query at the database server, the database server:
determining that the second query contains the aggregate function that targets the database object;
determining that at least a portion of the one or more aggregate values can be derived from statistics maintained for the database object in the data dictionary of the database;
rewriting the query to produce the rewritten query;
executing the execution plan that corresponds to the rewritten query; and
during execution of the execution plan, determining that statistics maintained for the database object in the data dictionary of the database are not accurate;
responsive to determining that statistics maintained for the database object in the data dictionary of the database are not accurate, generating the one or more aggregate values by aggregating data retrieved from the database object during runtime of the second query.

18. The one or more non-transitory computer-readable media of claim 12 wherein the instructions include instructions for:
   determining that approximation is acceptable for the query; and
   deriving at least a portion of the one or more aggregate values from statistics that are not accurate.

19. The one or more non-transitory computer-readable media of claim 18 wherein determining that approximation is acceptable to the query includes determining that the query has been explicitly designated as an approximate query.

20. The one or more non-transitory computer-readable media of claim 18 wherein determining that approximation is acceptable to the query includes determining that the query was issued in a session in which a session parameter indicates that approximate answers are acceptable.

21. The one or more non-transitory computer-readable media of claim 18 wherein determining that approximation is acceptable to the query includes determining that the query specifies generation of a histogram.

22. The one or more non-transitory computer-readable media of claim 18 wherein deriving the at least a portion of the one or more aggregate values from the statistics that are not accurate is performed responsive to determining that an accurate-enough indicator indicates that the statistics that are not accurate are accurate enough for approximate answers.

* * * * *

UNITED STATES PATENT AND TRADEMARK OFFICE
CERTIFICATE OF CORRECTION

PATENT NO. : 11,561,973 B2
APPLICATION NO. : 16/147521
DATED : January 24, 2023
INVENTOR(S) : Chakkappen et al.

It is certified that error appears in the above-identified patent and that said Letters Patent is hereby corrected as shown below:

In the Specification

In Column 10, Line 26, after "portability" insert -- . --, therefor.

In Column 10, Line 57, after "servers" insert -- . --, therefor.

In the Claims

In Column 11, Line 13, in Claim 1, delete "database dictionary" and insert -- data dictionary --, therefor.

In Column 13, Line 26, in Claim 12, delete "database dictionary" and insert -- data dictionary --, therefor.

Signed and Sealed this
Nineteenth Day of December, 2023

Katherine Kelly Vidal
*Director of the United States Patent and Trademark Office*